United States Patent [19]

Miller

[11] 4,280,073
[45] Jul. 21, 1981

[54] ELECTROMAGNETICALLY RELEASED SPRING APPLIED FRICTION BRAKE WITH TORQUE BOOSTER

[75] Inventor: Donald L. Miller, Horseheads, N.Y.

[73] Assignee: Facet Enterprises, Inc., Tulsa, Okla.

[21] Appl. No.: 16,586

[22] Filed: Mar. 1, 1979

[51] Int. Cl.³ .............................................. H02K 7/10
[52] U.S. Cl. ...................................... 310/77; 188/72.2
[58] Field of Search ............................. 310/77, 92–95; 188/71.4, 71.5, 72.2, 72.1, 72.3, 136, 139, 156, 158, 161, 162, 163

[56] References Cited

U.S. PATENT DOCUMENTS

| | | | |
|---|---|---|---|
| 2,520,204 | 8/1950 | Hancock | 310/77 UX |
| 2,693,254 | 11/1954 | Barish | 310/77 |
| 2,809,309 | 10/1957 | Evans | 310/77 |
| 3,068,975 | 12/1962 | Thever | 310/77 X |
| 3,562,565 | 2/1971 | Higashino | 310/77 |
| 3,583,529 | 6/1971 | Robinson | 188/72.2 X |
| 3,693,763 | 9/1972 | Powilleit | 188/72.2 X |
| 4,096,404 | 6/1978 | Sukhanov et al. | 310/77 X |

FOREIGN PATENT DOCUMENTS 304226  7/1971  U.S.S.R. ........................... 310/77

*Primary Examiner*—Mark O. Budd
*Attorney, Agent, or Firm*—Remy J. VanOphem

[57] ABSTRACT

A compactly sized spring-applied electromagnetically released radial face friction brake, with a ball-pocket torque booster producing increased torque capacity. The friction brake is released by energization of an electromagnetic coil attracting an axially movable armature, which nullifies the spring operator force to release the brake. A fail safe electric motor brake application of the brake includes a friction surface mounted to the cooling fan rotated by the electric motor armature to aid in dissipating the heat energy developed in braking.

10 Claims, 4 Drawing Figures

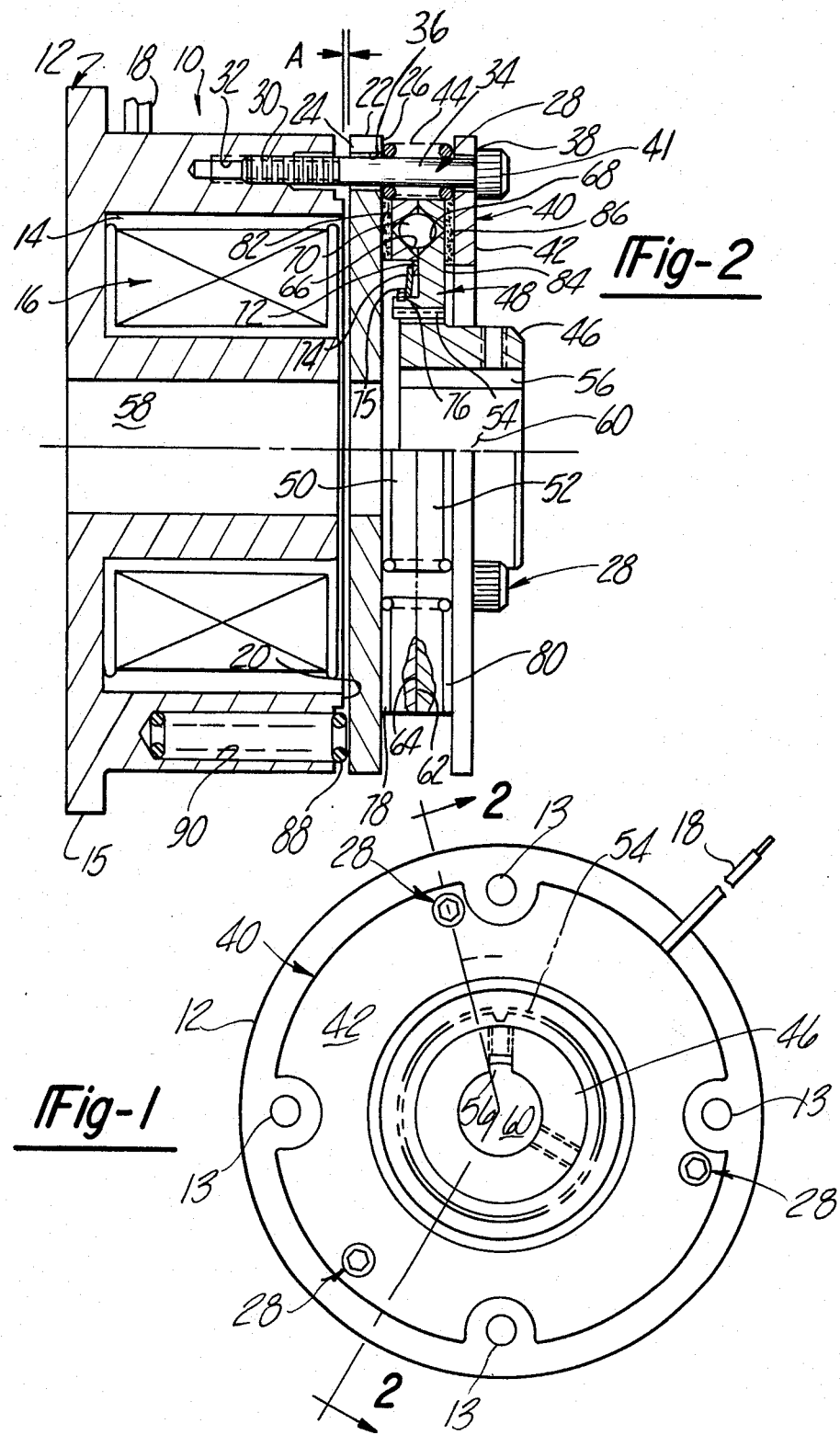

ELECTROMAGNETICALLY RELEASED SPRING APPLIED FRICTION BRAKE WITH TORQUE BOOSTER

BACKGROUND OF THE INVENTION

This invention concerns brakes and more particularly axially engaged radial face friction brakes.

Such brakes are sometimes designed to be spring engaged, and to be disengaged by an electromagnetic coil energized to attract an axially movable armature which acts to nullify the spring engagement force and release the brake.

The coil must, therefore, be sized to produce a sufficient electromagnetic attractive force on the armature to overcome the operator springs. The springs in turn control the torque capacity of the brake.

The size of the coil is the major factor in the overall size of the brake unit, and also in the cost of manufacture.

One application for such brakes which is receiving increasing attention is in electric motors for power saws in which an automatic brake application to brake the saw blade is highly desirable. The friction type engagement allows stopping without excessive shock loadings, and the controls are easily incorporated in the motor circuit to yield a fail safe engagement.

For radial arm saws, the axial dimension is critical to enable maximum tilt of the blade, and hence it is highly desirable to minimize the coil and coil housing size.

It is, therefore, an object of the present invention to provide such a spring-applied, electromagnetically released brake in which the size of the electromagnetic coil is significantly reduced over conventional designs.

It is another object of the present invention to provide such a brake in an electric motor for fail safe braking applications, such as power saws.

SUMMARY OF THE INVENTION

These and other objects of the present invention, which will become apparent upon a reading of the following specification and claims, are achieved by incorporating a ball and pocket torque booster into the brake in such a way so as to increase the axial engagement force over that developed directly by the operation of springs so as to reduce the spring force required for a given brake torque requirement, and hence, the required electromagnetic coil size. The torque booster action is not self-energizing so as to cease upon nullifying of the spring force.

In one embodiment, a rotationally fixed axially movable armature plate is urged away from the coil housing by the spring operators and into engagement with a double faced brake disc against a fixed braking plate, the brake disc being rotatably mounted to the hub to be braked. The brake disc is of two plate construction with a plurality of opposite pairs of ball pockets formed in adjacent opposite radial faces of each disc with a ball element disposed in each aligned pair. A washer spring urges the brake discs together. Whenever the coil is deenergized, the brake operator springs urge the friction surfaces into engagement with the armature and backing plates, with the reaction forces causing the ball elements to cam the armature into engagement with the corresponding radial face on the coil housing, thereby increasing the engagement force above that applied by the springs. After energization of the coil, the spring operator force acting on the armature is nullified, causing the release of the brake, with the electromagnetic force required being less than the total axial force generated by the spring-torque booster combination.

In another embodiment, incorporated in a power saw motor application, the ball elements are disposed in opposing pockets formed in the engaging faces of the electromagnetic coil housing and armature respectively, with the armature provided with a friction disc spring urged into engagement with an annular brake surface provided on the motor fan assembly.

DESCRIPTION OF THE DRAWINGS

FIG. 1 is an endwise view of a brake unit according to the present invention.

FIG. 2 is a view of the longitudinal section 2—2 taken in FIG. 1.

DETAILED DESCRIPTION OF THE DRAWINGS

Figure 3:
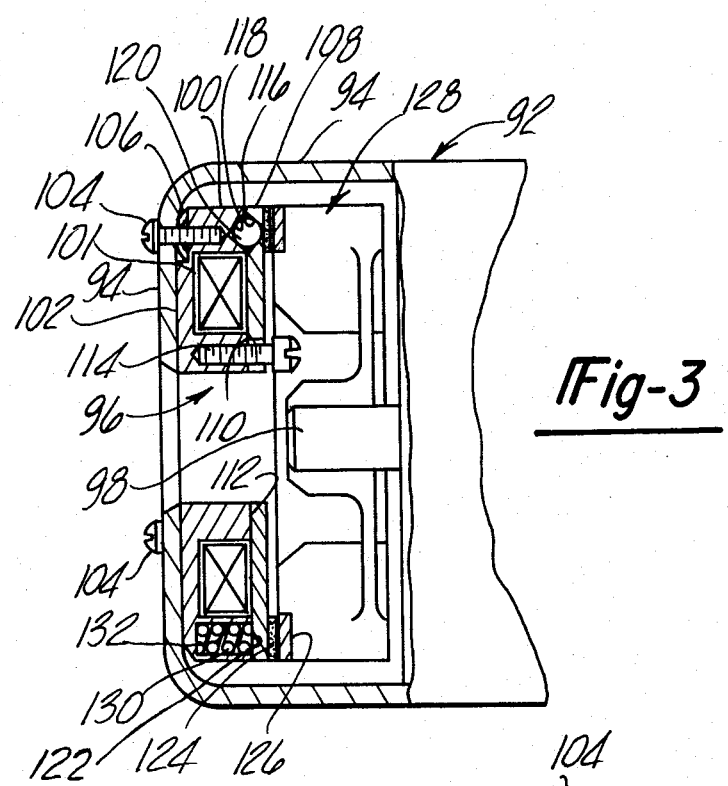
FIG. 3 is a fragmentary view of an electric motor in partial section depicting an alternate version of the brake unit incorporated therein.

In the following detailed description, certain specific terminology will be employed for the sake of clarity, and specific embodiments are described in accordance with the requirements of 35 U.S.C. 112, but it should be understood that this is not intended to limit the invention, inasmuch as the invention is capable of taking many forms and variations within the scope of the appended claims.

Referring to FIGS. 1 and 2, the brake unit 10 includes a stationary electromagnetic coil housing 12 having an annular cavity 14 within which is mounted an electromagnetic coil 16. The housing 12 is mounted to a stationary structure by suitable fasteners (not shown) extending through openings 13 formed in a flange 15 integral with the housing 12. The coil 16 is adapted to be energized by means including leads 18 and external controls including a power supply (not shown).

The housing 12 is formed with a radial face or surface 20 and immediately adjacent thereto is disposed an armature 22 having opposite radial faces 24 and 26, the radial face 24 being disposed opposite the radial surface 20 on the housing 12.

The armature 22 is mounted to the housing 12 by cap screws 28 each having a threaded section 30 received in axially extending threaded holes 32 formed in the housing 12. Cap screws 28 also are formed with body sections 34 extending through openings 36 providing a loose fit such as to enable ready axial movement of the armature 22, while restraining the same from rotation.

The cap screws 28 also extend through openings 38 formed in a backing plate 40, with cap screw heads 41 seating on the opposite face 42 thereof to provide an axial stop to absorb the axial reaction forces created by engagement of the brake unit 10. Return springs 44 encircle each of the cap screws 28 urging the armature 22 and backing plate 40 apart.

Friction braking means are provided to act on a rotatable hub 46 whenever the coil 16 is deenergized and includes a braking disc assembly 48 consisting of a pair of brake discs 50 and 52. Brake disc 52 is splined at 54 to the hub 46 so as to be rotatably joined thereto while allowing some axial float.

The hub 46 may be joined to a shaft (not shown) to be braked by a keyway 56 and key (not shown). Central openings 58 and 60 in the housing 12 and hub 46 respectively are provided to accommodate such shaft.

The brake discs 50 and 52 are each formed with respective facing radial surfaces 62 and 64, each formed with a plurality of oppositely disposed conical ball pockets 66 and 68, preferably forming three ball pocket pairs equispaced to provide balanced axial forces. Disposed in each ball pocket pair is a ball element 70.

The brake disc 50 is formed with a shoulder 72 engaged by a washer spring 74, seated on a snap retainer 75 disposed in a groove machined into a hub portion 76 to provide means for biasing the brake discs 50 and 52 together.

The brake means further includes friction rings 78 and 80 secured to remote radial surfaces 82 and 84, respectively.

The friction ring 78 is urged into frictional contact with the radial face 26 of the armature 22 and the friction ring 80 into contact with the radial face 86 of the backing plate 42 by a plurality of brake operator springs 88 acting on the radial face 24 of the armature 22.

Each of the operator springs 88 are mounted within pockets 90 formed in the housing 12. The operator springs 88 are sufficiently stiff to overcome the return springs 44 so as to create the frictional braking contact.

If the hub 46 is rotating, the torque reaction tends to cause relative rotation between the brake disc 52 rotating with the hub 46. This in turn causes a camming action between the ball elements 70 and the respective pockets 66 and 68, forcing the armature 22 axially away from the backing plate 42 and into engagement with the radial face 20 of the housing 12. The axial reaction force will be additive with the axial force of the operator springs 88 insofar as it is applied to the frictional engagement of friction rings 78 and 80 with the armature 22 and backing plate 42. Thus, this arrangement constitutes torque booster means increasing the engagement force by camming means reacting to the torque generated by the operator springs 88 to increase the torque capacity of the brake unit 10.

Upon energization of the coil 16, the armature 22, constructed of ferromagnetic material, as is the housing 12, is attracted to the radial face 20, with the power level of the coil being such as to nullify the axial force generated by the operator springs 88.

The ball elements 70 and the pockets 66 and 68 are configured such to insure that self-energization does not occur, so that upon effective removal of the engagement force, the brake discs 50 and 52 are returned together by the washer spring 74 and the armature 22 and the backing plate 42 are separated by the return springs 44, and the brake unit 10 is thus disengaged.

It will be noted that only the axial force generated directly by the net spring force is required to be nullified by the electromagnetic forces of the coil 16, rather than the total axial engagement force including that generated by the balls 70. Thus, in effect, a substantially smaller coil 16 and housing 12 may be used for a given brake capacity than that required in conventional designs.

The gap "A" may be adjusted by adjustment of the cap screws 28 such as to insure that the gap does not become excessive after the wear of the parts so as to insure the reliable disengagement of the brake unit under rest conditions.

Figure 4:
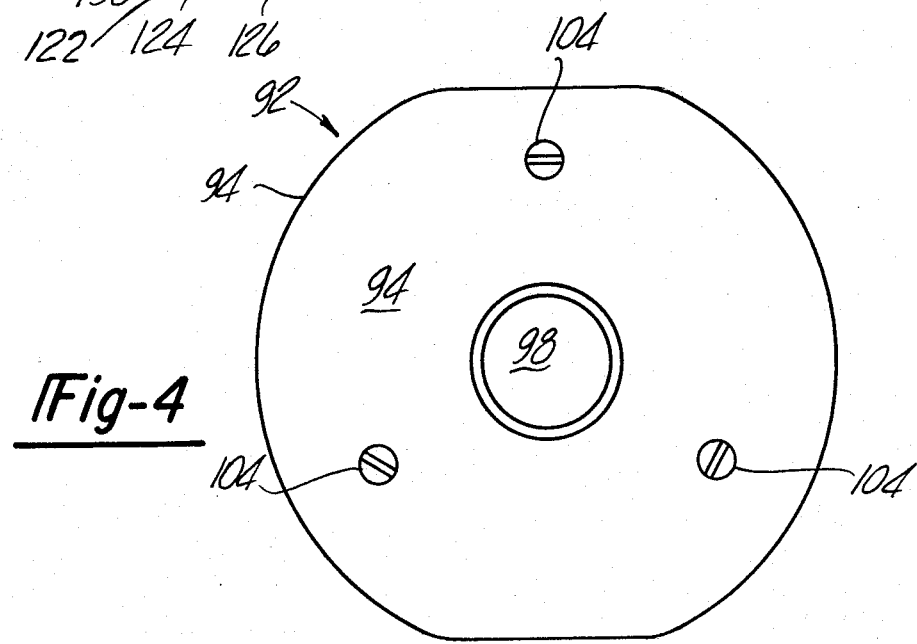
FIG. 4 is an endwise view of the electric motor depicted in FIG. 3.

Referring to FIGS. 3 and 4, an alternate version of the braking arrangement according to the present invention is depicted, incorporated in an electric motor 92, as for the power saw fail safe application described above.

The electric motor 92 includes a motor case 94 enclosing the motor components including the fail safe brake unit 96 adapted to automatically apply a braking force on the motor shaft 98 whenever the motor 92 is deenergized.

In this embodiment, the ferromagnetic coil housing 100 containing the coil 101 is mounted to an end wall 102 of the motor casing 94 to be stationary by means of the threaded fasteners 104 passing through the openings in the endwall and into the threaded holes in the coil housing 100.

The threaded fasteners 104 pass through the stiff washer springs 106 which are compressed by seating of the fasteners 104 on the end wall 102. This enables the adjustment of the axial position of the coil housing 100 by rotation of the fasteners 104 so as to allow relief of the compression of the washer springs 106.

This also enables the adjustment of the gap between the armature 108 and the coil housing 100 existing with the brake unit 96 disengaged.

The armature 108 is disposed with one radial face 110 adjacent a radial face 112 of the housing 100.

A plurality of screw fasteners 114 extend through the armature 108 and are seated in threaded openings in the coil housing 100 so as to maintain the brake unit 96 as an assembly prior to installation.

Each radial face 110 and 112 is formed with a plurality of conical pockets 116 and 118 respectively located opposite each other with a ball element 120 disposed in each opposite pair of pockets 116, 118.

The ball element 120 in this case acts together with pockets 116 and 118 to prevent rotation of the armature 108 relative to the housing 100 (except the slight amount occuring during engagement) as well as the camming means boosting the torque capacity of the brake.

The radial face 122 of the armature 108 is provided with a friction ring 124 secured thereto opposite an annular member 126 fastened to the motor cooling fan 128.

The brake operator springs 130 which are disposed in the pockets 132 formed in the coil housing urge the armature 108 into engagement with the annular member 126.

Accordingly, the brake 96 is normally engaged whenever the coil 101 is deenergized with the ball elements 120 increasing the engagement pressure over that created by the springs 130 in similar fashion to the above-described embodiment. Upon energization of the coil 101, as by a circuit providing power to the motor 92, the armature 108 is attracted to the coil housing 100 with a force sufficient to neutralize the operator springs 130 and the ball elements 120 are also thereby centered in the pockets 116 and 118 to effect complete release of the friction ring 124 from engagement with the ring 126.

It can be appreciated that in addition to the advantage of compactness afforded by the inclusion of the brake unit 96 according to the present invention, the fan mount for the ring 126 allows rapid dissipation of the heat generated in braking.

It can be appreciated that this concept can take many forms and variations, as in these two differing versions thereof.

What I claim is:

1. A friction braking arrangement comprising:
at least one rotatable member to be braked;
a stationary ferromagnetic housing mounted adjacent to said at least one rotatable member;
a ferromagnetic armature interposed said rotatable member and said stationary ferromagnetic housing and means mounting said armature to said housing for relative axial movement while restraining said armature against free relative rotation;
spring operator means interposed said armature and said ferromagnetic housing for generating a force acting on said armature tending to urge said armature axially away from said housing;
friction engagement means for creating a frictional breaking force on said at least one rotatable member by the urging of said armature away from said stationary housing;
electromagnetic means mounted in said ferromagnetic housing and acting when energized, for urging said armature axially towards said ferromagnetic housing with a force nullifying said spring operator force; and
torque booster means comprising non self-energizing camming means reacting to the torque reaction generated by said friction engagement means to increase the axial engagement force only when said spring operator force is exerted on said armature, whereby the increased axial engagement force increases the torque capacity of said brake arrangement, said camming means comprising conical ballrecess engagement means interposed said at least one of said rotatable member and at least another of said rotatable members.

2. The friction braking arrangement according to claim 1 wherein said conical ball recess engagement means comprises a plurality of conical pocket pairs in said at least one and said at least another of said rotatable members, a plurality of ball elements disposed in said conical pocket pairs, each formed in separate rotatable members transmitting braking torque through said braking arrangement when engaged.

3. The friction braking arrangement according to claim 1 wherein said rotatable member comprises a brake hub, said friction engagement means comprising a pair of brake discs positioned adjacent each other, and to said armature, one of said brake discs being rotatably driven by said at least one rotatable member, the other of said brake discs being relatively rotatable with respect to said at least another rotatable member and further including a stationary backing plate disposed adjacent to said brake discs but remote from said armature and said stationary housing including friction surfaces on said armature, said brake discs and said backing plate generating the braking torque acting on said hub under the urging of said spring operator means, and wherein said conical ball-recess engagement means is disposed between said brake discs and reacts to the transmission of braking torque into said hub through said one of brake discs to produce the torque booster action.

4. The friction braking arrangement according to claim 3 wherein said conical ball-recess engagement means comprises a plurality of ball elements and corresponding conical pocket pairs formed in adjacent opposed radial faces of said brake discs in aligned locations, said ball elements each disposed in the resulting aligned pairs of said conical pockets.

5. The friction braking arrangement according to claim 4 further comprising spring bias means for urging said radial faces of said brake discs together.

6. The friction braking means according to claim 5 further comprising a plurality of headed fasteners seated in said stationary housing and passing through said backing plate and said armature to provide rotational restraint of said armature and said backing plate, said headed fasteners engaging said backing plate to absorb the axial reaction of said spring operator means.

7. The friction braking means according to claim 1 wherein said conical ball recess engagement means includes a plurality of ball elements and a corresponding plurality of conical pocket pairs formed in aligned locations in adjacent opposed radial faces of said armature and said stationary housing with said ball elements each disposed in the resulting aligned conical pocket pair.

8. A fail safe braking arrangement for an electric motor of the type having a cooling fan and a motor casing, comprising:
a stationary ferromagnetic brake housing fixed to said motor casing, said housing having a radial face;
an electromagnetic coil mounted in said housing;
an axially movable ferromagnetic armature disposed adjacent to said radial face of said housing;
an annular friction surface mounted to said motor fan and mounted adjacent to said armature so as to be frictionally engaged by said armature;
spring operator means for urging said armature away from said radial face of said housing and into engagement with said annular friction surface;
torque booster means comprising non self-energizing camming means reacting to the brake torque generated by said spring operator means to increase the engagement pressure between said armature and said further surface, said camming means comprising conical ball-recess engagement means interposed said armature and said housing; and
means for energizing said coil when said electric motor is energized so as to create an attractive force on said armature and thereby nullifying said operator spring force to release said brake.

9. The electric motor brake unit according to claim 9 wherein said conical ball-recess engagement means includes a plurality of ball elements and corresponding plurality of pockets formed respectively in said radial faces of said armature and said housing, said pockets aligned with each other to form conical pocket pairs, each of said ball elements disposed in a pocket pair.

10. The electric motor brake unit according to claim 8 further comprising:
spring bias means for adjusting the gap between said housing and said armature when said braking arrangement is disengaged.

* * * * *

UNITED STATES PATENT AND TRADEMARK OFFICE
CERTIFICATE OF CORRECTION

PATENT NO. : 4,280,073
DATED : July, 21, 1981
INVENTOR(S) : Donald L. Miller

It is certified that error appears in the above—identified patent and that said Letters Patent is hereby corrected as shown below:

Column 6, line 51, claim 9, delete "9" and insert ----8----.

Signed and Sealed this

Twenty-seventh Day of October 1981

[SEAL]

Attest:

GERALD J. MOSSINGHOFF

Attesting Officer

Commissioner of Patents and Trademarks